United States Patent Office.

PETER H. VANDER WEYDE AND JOHN MATTHEWS, JR., OF NEW YORK, N. Y.

Letters Patent No. 88,348, dated March 30, 1869; antedated March 18, 1869.

IMPROVEMENT IN THE PREPARATION OF AERATED DRINKS FOR MEDICINAL PURPOSES.

The Schedule referred to in these Letters Patent and making part of the same.

To all whom it may concern:

Be it known that we, PETER H. VANDER WEYDE, M. D., and JOHN MATTHEWS, Jr., both of the city of New York, in the county of New York, in the State of New York, have invented a new and useful Improvement in the Preparation of Artificially-Aerated Drinks, for Medicinal and Hygienic Purposes; and we do hereby declare that the following is a full and exact description thereof.

Our improvement consists in incorporating, in artificially, aerated drinks, nitrous oxide, or laughing-gas, under pressure, in the same way that, thus far, carbonic acid alone has been introduced; but as pure water does not dissolve this gas in such a quantity as it dissolves carbonic acid, and a large quantity in solution is very desirable; and as we also discovered that the solvent power of water for these gases increases by the addition of sugar, of gum, of gelatine, of albumen, of alcohol, and of many other organic substances, we do increase the solvent power of the water by the addition of sugar, or its equivalent, or any other suitable substance. We also add, sometimes, a certain quantity of carbonic-acid gas, by which latter addition we, at the same time, communicate to it the pleasant pungent taste peculiar to the carbonic-acid drinks.

As nitrous-oxide water has proved to be a remedial agent for rheumatism, neuralgia, &c., its introduction in the trade, in suitable packages, will be a benefit, medicinally considered, but it will be also a preferable substitute for the exciting alcoholic drinks, as its slight intoxicating effects pass off in a few minutes.

What we claim, and wish to secure by Letters Patent, is—

1. The combination of a solution of sugar, or its equivalent, in water, with nitrous oxide, or laughing-gas, for medicinal purposes.
2. The combination of a solution of sugar, or its equivalent, in water, with nitrous oxide, or laughing-gas, carbonic-acid gas, and any flavoring-ingredient, forming an exhilarating substitute for the injurious, irritating alcoholic drinks.

In witness whereof, we have signed our names, in presence of two witnesses.

JOHN MATTHEWS, JR.
P. H. VANDER WEYDE, M. D.

Witnesses:
E. STEPHENSON,
CHAS. WESTERN.